US005109238A

United States Patent [19]

Watanabe et al.

[11] Patent Number: 5,109,238

[45] Date of Patent: Apr. 28, 1992

[54] THICK FILM RESISTOR MATERIAL AND THERMAL HEAD OBTAINED THEREFROM

[75] Inventors: Michihiro Watanabe, Tsuchiura; Kazutaka Sato; Munetoshi Zen, both of Kashiwa; Kazuhiko Ato, Mito; Yoshinobu Watanabe, Hiratsuka; Sadayoshi Taguchi, Hadano, all of Japan

[73] Assignees: Hitachi, Ltd.; Tanaka Matthey Co., both of Tokyo, Japan

[21] Appl. No.: 664,302

[22] Filed: Mar. 4, 1991

Related U.S. Application Data

[60] Division of Ser. No. 425,442, Oct. 23, 1989, Pat. No. 5,021,194, which is a continuation of Ser. No. 119,918, Nov. 13, 1987, abandoned.

[30] Foreign Application Priority Data

Nov. 14, 1986 [JP] Japan ............................... 61-269687

[51] Int. Cl.[5] ...................... G01D 15/10; B32B 17/06; B32B 15/04; H01B 1/06

[52] U.S. Cl. ............................... 346/76 PH; 428/428; 428/432; 428/433

[58] Field of Search ................. 346/76 PH; 338/22 R, 338/225 D, 309; 428/428, 432, 433

[56] References Cited

U.S. PATENT DOCUMENTS

| | | | |
|---|---|---|---|
| 3,679,607 | 10/1967 | Angus | 252/518 |
| 4,051,074 | 9/1977 | Asada | 252/518 |
| 4,175,061 | 1/1979 | Fujimura | 252/518 |
| 4,203,025 | 5/1980 | Nakutoni et al. | 346/76 PH |
| 4,204,107 | 5/1980 | Ohkubo et al. | 346/76 PH |
| 4,362,656 | 12/1982 | Hormadaly | 252/518 |
| 4,415,624 | 11/1983 | Probhu et al. | 428/432 |
| 4,439,352 | 3/1984 | Asada et al. | 252/518 |
| 4,476,039 | 10/1984 | Hormadaly | 338/20 |

*Primary Examiner*—Ellis P. Robinson
*Assistant Examiner*—Frank Rosenberg
*Attorney, Agent, or Firm*—Antonelli, Terry, Stout & Kraus

[57] ABSTRACT

A thermal head obtained by calcining a mixed material comprising at least ruthenium oxide particles having specific surface area of 10 to 45 $m^2/g$ and a particle size of 1 μm as the upper limit value of particle size distribution, glass fine particles and a dispersant which disperses these fine particles and disappears by calcining can reduce scattering of resistance values and give high image quality at thermal printing.

25 Claims, 5 Drawing Sheets

THICK FILM RESISTOR MATERIAL AND THERMAL HEAD OBTAINED THEREFROM

This application is a divisional application of application Ser. No. 07/425,442, filed Oct. 23, 1989, now U.S. Pat. No. 5,021,194 which is a continuation application of application Ser. No. 07/119,918, filed Nov. 13, 1987 now abandoned.

BACKGROUND OF THE INVENTION

This invention relates to a material for thick film resistor for thermal head, a thick film resistor for thermal head obtained therefrom, and a thermal head obtained by coating the material for thick film resistor on a substrate and a thermal head calcining, and suitable for thermal printing with high image quality.

Materials for thick film resistors constituting thick film thermal heads have heretofore aimed at improving breakdown power characteristics and stabilizing the resistance values during operation as disclosed, for example, in Japanese Patent Examined Publication No. 56-13629, or aimed at improving the selectivity of the resistance values by heat treating a resistor paste at high temperatures as disclosed, for example, in Japanese Patent Unexamined Publication No. 50-67486.

In other words, the prior art thick film thermal heads have only aimed at reducing the price and maintaining the reliability of the resistors, and ignored the reduction of scattering of resistance values of thermal head required for high image quality. That is, it has not been considered to make the output image high quality by reducing the scattering of resistance values of thick film thermal heads, which have scattering of resistance values of about ±20% in terms of the maximum-minimum value width and about 7% in terms of variance. By such scattering, foaming non-uniformity takes place, which results in giving unsatisfactory images.

SUMMARY OF THE INVENTION

It is an object of this invention to provide a material for a thick film resistor for a thermal head, a thick film resistor for a thermal head, and a thermal head obtained therefrom, and reducing the scattering of resistance values for giving a high quality image of a heat-sensitive recording.

This invention provides a material for a thick film resistor for a thermal head comprising at least ruthenium oxide fine particles, glass fine particles and a dispersant which disperses these fine particles and disappears by calcining, said ruthenium oxide fine particles having a specific surface area of 10 to 40 $m^2/g$ and a particle size of 1 $\mu m$ as the upper limit value of particle size distribution.

This invention also provides a thick film resistor for a thermal head wherein at least ruthenium oxide is dispersed in glass, said ruthenium oxide being obtained from ruthenium oxide fine particles having a specific surface area of 10 to 40 $m^2/g$ and a particle size of 1 $\mu m$ as the upper limit value of particle size distribution.

This invention further provides a thermal head obtained by laminating a glaze layer, electrodes, a resistor layer and a protective layer on a substrate in this order, said resistor layer being obtained by calcining a mixed material comprising at least ruthenium oxide fine particles, glass fine particles and a dispersant which disperses these fine particles and disappears by calcining, said ruthenium oxide particles having a specific surface area of 10 to 40 $m^2/g$ and a particle size of 1 $\mu m$ as the upper limit value of particle size distribution.

DESCRIPTION OF THE PREFERRED EMBODIMENTS

Figure 1:
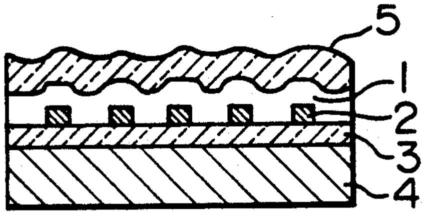
FIG. 1 is a cross-sectional view of one example of a thermal head according to this invention.

According to this invention, the reduction of scattering of resistance values can be attained by uniformly dispersing ruthenium oxide fine particles, which deeply pertain to the control of resistance values, in glass frit and controlling the scattering of particle sizes of ruthenium oxide particles by using finer particles, without changing the compounding proportions of prior art materials.

The material for a thermal head thick film resistor of this invention is a mixed composition comprising at least ruthenium oxide fine particles, glass fine particles and a dispersant which disperses these fine particles and disappears by calcining and takes a form of a so-called paste. One feature of this invention resides in the use of special ruthenium oxide fine particles having a specific surface area of 10 to 40 $m^2/g$ and a particle size of 1 $\mu m$ or less, that is the upper limit of particle size distribution is 1 $\mu m$.

The mixed composition may further contain one or more other electroconductive substance fine particles and oxide fillers in addition to the ruthenium oxide particles.

Examples of the oxide fillers are zirconium oxide, titanium oxide, silicon oxide, aluminum oxide, sodium oxide, calcium oxide, and the like.

Examples of the other electroconductive substances are metals or oxides of platinum group elements.

These oxide fillers and electroconductive substances are used as additives for improving breakdown power characteristics. The amount of these additives is sufficient in a trace amount. The particle size of these additives is preferably about 1 $\mu m$ or less.

Since it is possible to select various resistor film compositions depending on types of thermal head, if a uniform dispersion system can be attained in this invention, there is no particular limit to the amounts of the components of the mixed composition. But, it is preferable to use ruthenium oxide in an amount of 10 to 30% by weight.

Examples of the dispersant (or dispersing medium which includes a solvent and becomes a base for preparing a paste of ruthenium fine particles and glass fine particles) are resins such as ethylcellulose, etc.; and/or solvents such as butyl carbitol acetate, α-terpineol, tridecanol, etc. These dispersants are used for forming a paste in an amount of preferably 10 to 30% by weight.

As to the glass, there is no particular limit so long as there is used glass frit having a high melting point. Preferable examples of the glass are borosilicate glass, borosilicate lead glass, silicate-lead glass and crystallized glass. The particle size of glass particles is preferably about 1 μm or less. The glass becomes a base for constituting a network of ruthenium oxide.

The thick film resistor for thermal head can be formed by calcining (e.g. at 870° C. for 1 hour) the above-mentioned paste. The dispersant such as a solvent disappears by calcining. On the other hand, some ruthenium oxide fine particles may bond each other to form grains by growing, but the ruthenium oxide forms an almost uniform network in the glass.

The thermal head of this invention can be produced by coating the paste on an insulating substrate by a conventional thick film printing technique such as screen printing to form a resistor layer, connecting conductors to the resistor, and if necessary forming a glass coating thereon, followed by calcining. The most suitable thermal head of this invention comprises a substrate, a glaze layer formed thereon, electrodes formed thereon, a resistor layer obtained from the above-mentioned resistor paste thereon, and a protective layer formed on the resistor layer. As the substrate, there can be used an alumina plate, a glass plate, etc. As the glaze layer and protective layer, there can be used glass, etc. As the electrode, gold is most preferable and copper can also be used.

The material for thermal head thick film resistor is a mixture comprising at least ruthenium oxide fine particles, glass fine particles and a solvent and/or a resin as mentioned above. When the mixture is calcined, the dispersing medium component such as a solvent evaporates and disappears to form a network of ruthenium oxide particles in molten glass. As can be appreciated, since the glass becomes molten during calcining of the mixture, the glass used has a lower melting temperature than the calcining temperature of the mixture. After calcining of the mixture, the network of ruthenium oxide particles is provided in glass which was molten during the calcining process.

The present inventors have found for the first time that when the particle size of ruthenium oxide fine particles and the specific surface area thereof are limited as mentioned above, the uniformity of mutual distance between ruthenium oxide particles and the uniformity of the distribution state of ruthenium oxide particles in glass frit can be attained, that is the uniformity of the above-mentioned network can be attained so as to suppress scattering of resistance values. The ruthenium oxide thus forms a passage of electric current by the network in the glass frit and gives electro-conductivity.

The particle size and specific surface area of ruthenium oxide required in this invention are measured as follows.

(1) Particle Size

The particle size at 50% of cumulative weight percent in the particle size distribution measured by a light transmission method (a method applying the Stokes's precipitation rate equation and the Lambert-Beer's law). The value is not an average value, but an upper limit value. In the following working examples, an apparatus of Micron Photo Sizer (SKN-1000) is used.

(2) Specific Surface Area

The specific surface area obtained by adsorbing a powder with a gas to form a single molecular layer and measuring the amount of gas adsorbed. This is based on the B.E.T. adsorption theory and means an area per gram of a powder.

There is the following relationship between the particle size and the specific surface area:

$$\text{Particle size } (\mu m) = \frac{6}{\text{Specific surface area } (m^2/g) \times \text{Particle density } (g/ml)}$$

According to the above-mentioned equation, the specific surface area of only particles having the particle size of 1 μm is 1.2 $m^2/g$, and 12 $m^2/g$ at 0.1 μm, in theory, as far as ruthenium oxide fine particles are concerned. In general, the surface area becomes larger, when the particle diameter becomes smaller.

According to this invention, it is possible to control non-uniformity of color development at the time of heat-sensitive transfer by using a thermal head by the reduction of scattering of resistance values of thermal head thick film resistors. Thus, printings with high image quality can be obtained. This makes it possible to apply this invention to produce colored hard copies.

This invention is further illustrated by referring to the attached drawings.

Figure 2:
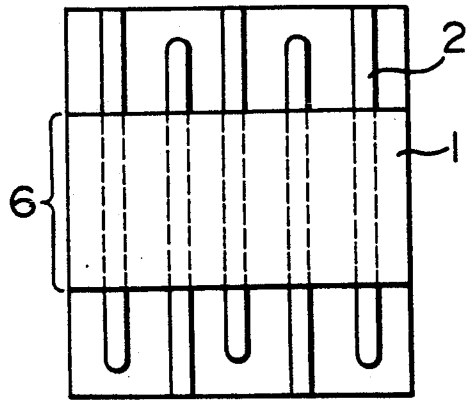
FIG. 2 is a plane view of the same thermal head as shown in FIG. 1.

FIG. 1 is a cross-sectional view of one example of a thermal head according to this invention. FIG. 2 is a plane view of the same thermal head as shown in FIG. 1.

In this embodiment, a glaze layer 3 is formed on an alumina substrate 4 and electrodes 2 [three from the common side (+ side) and two from the driver side (− side) extending mutually] are formed on the glaze layer 3. The electrodes 2 are made of a metal coated with gold and the glaze layer is made of glass. The thermal head thick film resistor 1 is laminated on the glaze layer 3 so as to cover the central portion of the electrodes 2 in the form of a belt as shown in FIG. 2. The belt-like region becomes a heat generating region 6 and constitutes unit image elements. Further, the surface of the thermal head thick film resistor 1 is covered by a protective layer 5 made of glass. Therefore, the thermal head thick film resistor 1 and the electrodes 2 can be seen through the glass protective layer 5 as shown in FIG. 2.

In this embodiment, the thickness of the glaze layer 3 is 80 μm, and the electrodes 2 have a thickness of 0.6 to 3 μm and a width of 20 μm. The thermal head thick film resistor 1 has a thickness of 5 μm, a pitch of 82.5 μm and a width of 300 μm. The number of image elements is 512. The thickness of the protective layer 5 is 7.5 μm.

Figure 3:
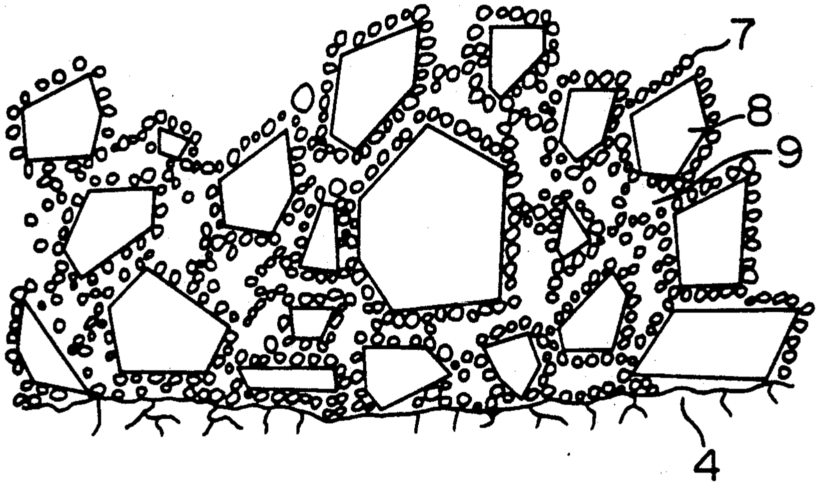
FIG. 3 is a modeled cross-sectional view of a resistor paste after printed on a substrate.
Figure 4:
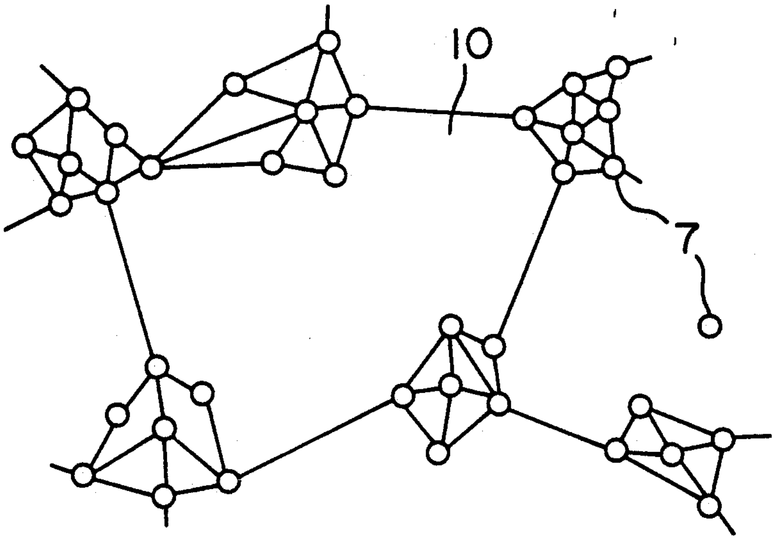
FIG. 4 is a modeled cross-sectional view of a resistor paste after calcining.

The paste ($RuO_2$ 35 wt %, glass 35 wt %, dispersant 30 wt %) for forming the thermal head thick film resistor 1 by calcining is a mixture of electroconductive ruthenium oxide fine particles, glass fine particles, butyl carbitol acetate as a solvent and ethyl cellulose as a resin. After printing on a substrate (before calcining), the paste has a cross-sectional structure as shown in FIG. 3, wherein numeral 4 denotes a substrate, numeral 7 denotes ruthenium oxide fine particles, numeral 8 denotes glass particles, and numeral 9 denotes a dispersant such as a solvent and/or a resin. When the paste is calcined at high temperatures such as 830° C.–870° C., the dispersant evaporates and a network of ruthenium oxide particles is formed in molten glass as shown in FIG. 4 wherein numeral 7 is the network of ruthenium oxide and numeral 10 is a model line showing that ruthenium oxide particles are contacted and make an electric current passage. Thus, the desired resistance values with reduced scattering is obtained.

When the ruthenium oxide fine particles have a particle diameter satisfying the limited conditions as defined in this invention, a relatively uniform network is formed in molten glass. As a result, the scattering of resistance values almost disappears to control developed color density non-uniformity. This phenomenon has been found by the present inventors for the first time.

Figure 5:
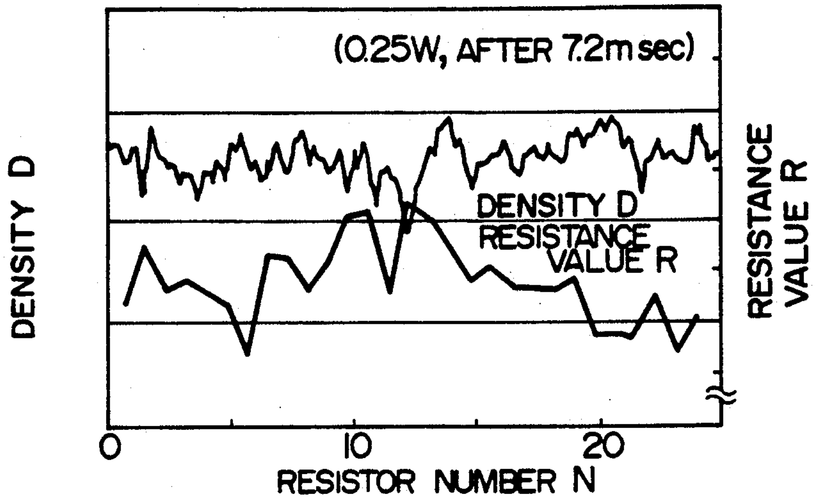
FIG. 5 is a graph showing a relationship between scattering of resistance values and optical density non-uniformity.

The relationship between the resistance values and the microscopic developed color density is shown in FIG. 5. In FIG. 5, the ordinate axis shows the developed optical density (D) and the resistance value (R) and the absissa axis shows sample numbers of resistors. Since a full-color printer is of constant-voltage-drive in general, the heat release value ($V^2/R$) varies depending on the resistance value R. In practice, since the heat release value is lowered and the developed optical density is also lowered when R is large, shading appears so as to produce non-uniformity in the developed color.

Figure 6:
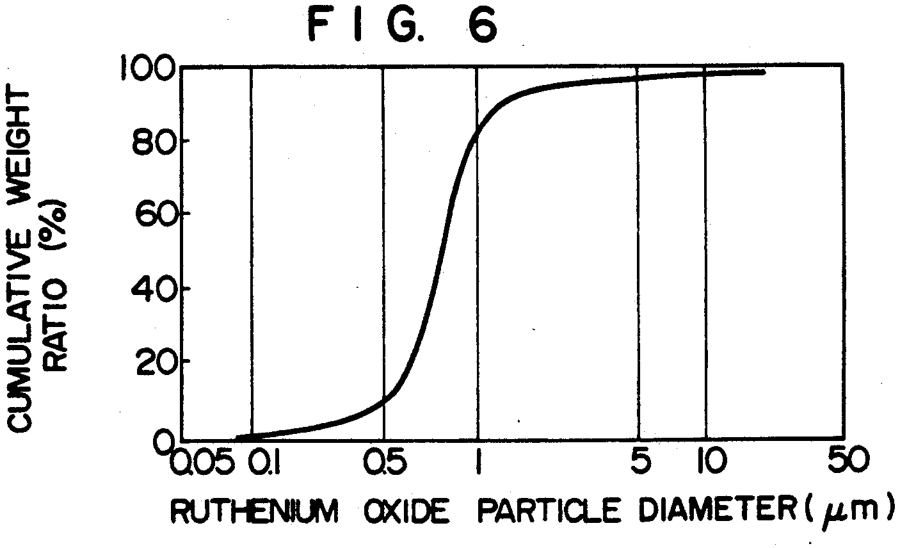
FIG. 6 is a graph showing particle size distribution of ruthenium oxide particles.

FIG. 6 shows one example of particle size distribution of ruthenium oxide fine particles used as resistor material for a prior art thick film thermal head. As is clear from FIG. 6, the particle diameter of ruthenium oxide fine particles is distributed widely from 0.1 μm to 10 μm. Upon microscopic observation, it becomes clear that these particles are a mixture of ultrafine particles of about 0.1 μm with relatively the same particle diameters and larger particles with particle diameter of 1 μm or more. This tendency is also clear from FIG. 6. That is, cumulative weight proportion of ruthenium oxide fine particles changes remarkably at about 1 μm. This is clear from the fact that when ruthenium oxide particles of 1 μm or more are removed, almost all gross particles can be removed.

Figure 7:
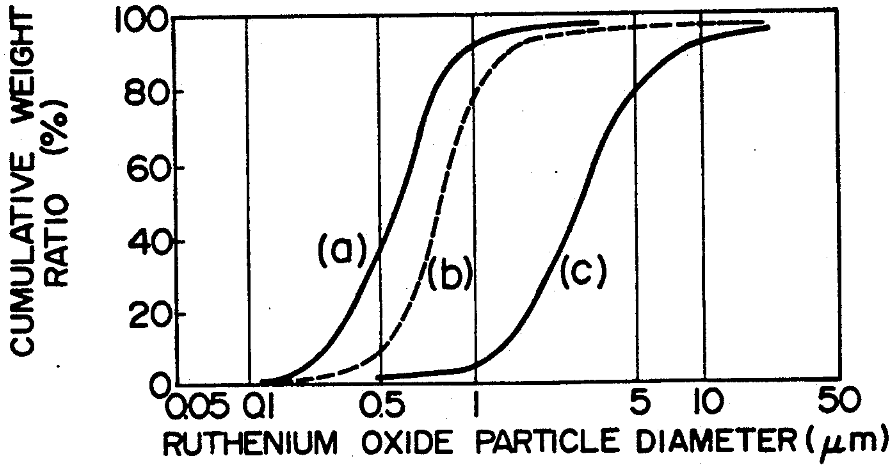
FIG. 7 is a graph showing particle size distribution of ruthenium oxide particles after classification.

For realizing the above-mentioned fact, the classification of ruthenium oxide fine particles becomes a problem to be solved. As the classification methods, there are a centrifugal method which applies the same principle as that of a centrifugal separator, and a sedimentation method wherein classification is effected by difference in sedimentation rates in a liquid. FIG. 7 shows one example of the results of classification conducted as mentioned above. In FIG. 7, the curve (b) shows the distribution before classification, the curve (a) shows the distribution after removing the particles of 1 μm or more, and the curve (c) shows the distribution after removing the particles less than 1 μm. The curve (b) means a mixture containing particles of 1 μm or more. In contrast, the curve (a) shows the classified grade usable in this invention. In FIG. 7, the weight ratio is increased after removing the particles of 1 μm or more probably due to a measurement error of particle size distribution. In the case of curve (c), the word "removing" does not mean complete removal, but removal of about 90%, resulting in causing an error in such a range.

When classified and selected ruthenium oxide fine particles are used, the resistance values at the same weight ratio are lowered generally compared with prior art particles. This is because when finer ruthenium oxide particles are used, the network of ruthenium oxide in glass becomes dense and gives lowered resistance values. For this reason, in order to make the resistance values in the desired limited range, it is desirable to make the weight ratio ($RuO_2$/paste) smaller. On the other hand, the use of classified glass frit is advantageous due to easy dispersion. But since the glass frit melts upon calcining, the influence is not remarkable. But the particle size of glass frit influences the arrangement of resistance values and the fixing of temperature coefficients of resistance (T.C.R.), so that it is desirable to select the proper particle size of glass frit depending on purposes.

Figure 8:
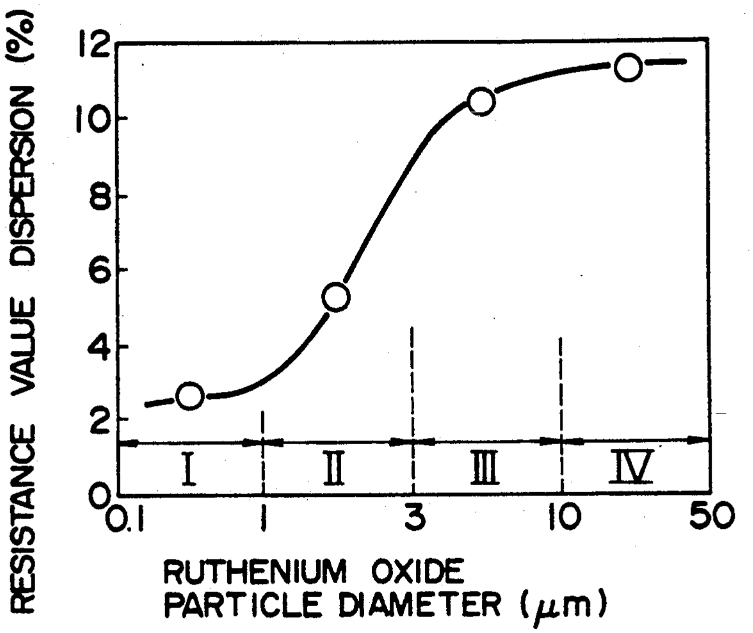
FIG. 8 is a graph showing scattering of resistance values depending on classifying levels.

FIG. 8 shows scattering of resistance values after calcining resistor pastes containing various classified ruthenium oxide fine particles. The calcining temperature is 850° C. The ordinate axis of FIG. 8 shows dispersion (or scattering) of resistance values of 500 dots. The dispersion of resistance values is defined as a value obtained by dividing a total of maximum and minimum resistance values of all the dots by an average value of the resistance values. In FIG. 8, the region I contains the particles having a particle diameter of 1 μm or less obtained by classification, the region II contains the particles of 1 to 3 μm obtained by classification, the region III contains the particles of 3 to 10 μm obtained by classification, and the region IV contains the particles of 10 μm or more obtained by classification. As shown in FIG. 8, the scattering of resistance values increases rapidly when the region is changed from I to II. Thus, the present inventors have found that the scattering of resistance values can be made remarkably little by removing gross particles having a particle diameter of more than 1 μm.

The breakdown power characteristics which are one of the important properties of thermal head thick film resistors can be made excellent by using ruthenium oxide fine particles having a specific surface area of 10 to 40 $m^2/g$ compared with the case of using prior art resistor materials.

The breakdown power characteristics mean the amount of power supplied which a resistor can withstand. For example, 0.3 watt of power is supplied to a resistor for 10 minutes. Then, 0.4 watt of power is supplied for 10 minutes. Further, 0.5 watt of power is supplied for 10 minutes. Thus, the power is increased to 0.6 watt, 0.7 watt, and the like gradually and the amount of power at which the resistor is broken down is measured to evaluate the breakdown power characteristics.

Figure 9:
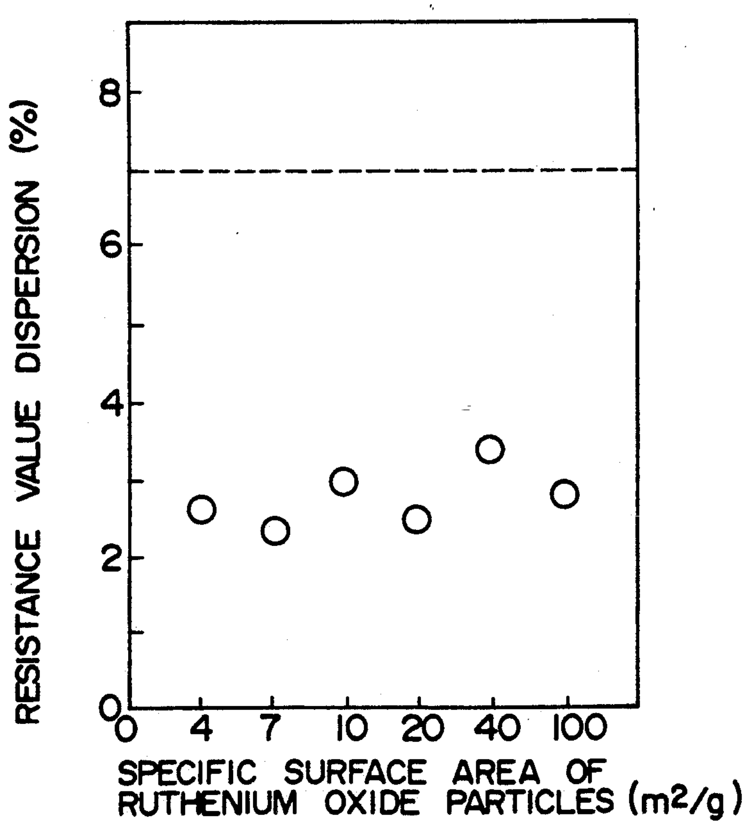
FIG. 9 is a graph showing a relationship between the specific surface area of classified ruthenium oxide particles and the scattering of resistance values.

In order to show this, ruthenium oxide having primary particles with a particle diameter of about 0.05 μm and a specific surface area of 200 $m^2/g$ were heat treated at 300° C., 400° C., 500° C., 600° C., 700° C. or 800° C. and subjected to classification for removing particles of 1 μm or more to prepare 6 kinds of ruthenium oxide particles having a specific surface area of 4, 7, 10, 20, 40 and 100 $m^2/g$. By using individual ruthenium oxide fine particles, 6 resistor pastes were prepared by adding thereto glass fine particles, ethyl cellulose and butyl carbitol acetate ($RuO_2$ 35 wt %, glass 35 wt %, dispersant 30 wt %). On a practical thermal head substrate, a resistor paste was coated by screen printing, followed by drying at 120° C. for 10 minutes and calcining at 870° C. FIG. 9 shows scattering (or dispersion) of resistance values of thermal heads thus produced. As is clear from FIG. 9, by using ruthenium oxide fine particles obtained by removing those having a particle diameter of 1 μm or more, the scattering of resistance values becomes smaller than prior art materials irrespective of the specific surface area. In FIG. 9, the dotted line shows the level of prior art material wherein non-classified ruthenium oxide particles are used.

Figure 10:
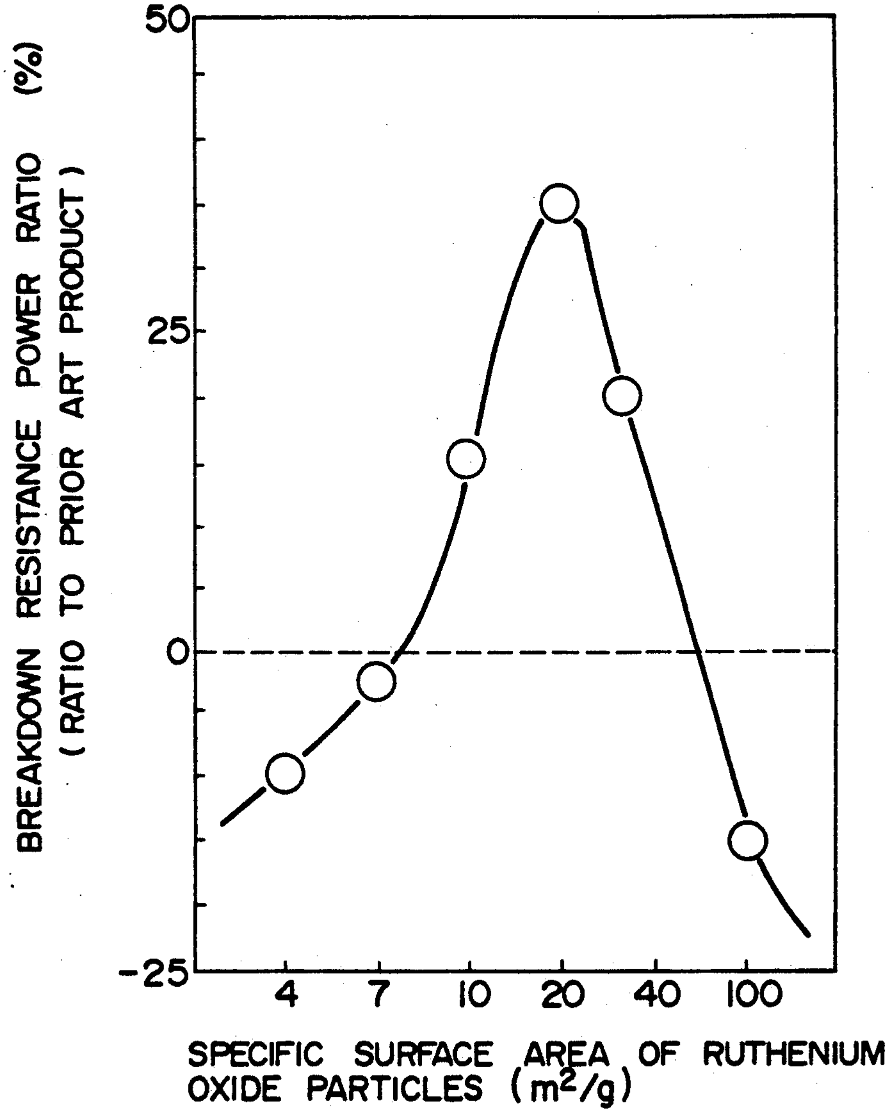
FIG. 10 is a graph showing a relationship between the specific surface area of classified ruthenium oxide particles and the breakdown power.

FIG. 10 shows the results of a step stress test (SST) for measuring breakdown power. The breakdown power means the power (W) at which a resistor is broken down when the breakdown power characteristics are evaluated. The SST is a test for measuring the change of resistance values by applying a high voltage to a resistor stepwise. For example, 20000 pulses (pulse width of 16 msec with an interval of 16 msec) are first applied to a resistor at 0.3 watt of power to measure a resistance value. A changing rate from an initial value is plotted on a graph. Then the power is increased to 0.4 watt and 20000 pulses are applied to plot the changing rate of the resistance in the same manner as mentioned above. Likwise, the power is increased to 0.5 watt, 0.6 watt, and the like stepwise, plotting changing rates of resistance, respectively, until the changing rate exceeds a certain value (e.g. 5%), at which power the resistor is estimated to be broken down.

In the test of FIG. 10, the breakdown is judged when a resistance value change exceeds the upper limit. In FIG. 10, the breakdown power ratio is taken along the ordinate axis, wherein the degree of improvement is shown compared with the prior art resistor paste taking the breakdown power of prior art paste as 1. As is clear from FIG. 10, the breakdown power ratio is 15% or more (considerably effective), when the ruthenium oxide fine particles has a specific surface area of 10 to 40 $m^2/g$. When the specific surface area becomes too large, that is, the particles become finer, the resistance values are lowered generally, so that it is necessary to reduce the amount of the particles in order to maintain the desired value. As a result, passages of the electroconductive network becomes narrower and the SST characteristics are lowered. On the other hand, when the specific surface area becomes too small, that is too gross, there is a tendency to deteriorate the SST characteristics due to the loss of uniformity of electroconductive network. In FIG. 10, the dotted line shows the prior art level as in the case of FIG. 7.

Figure 11:
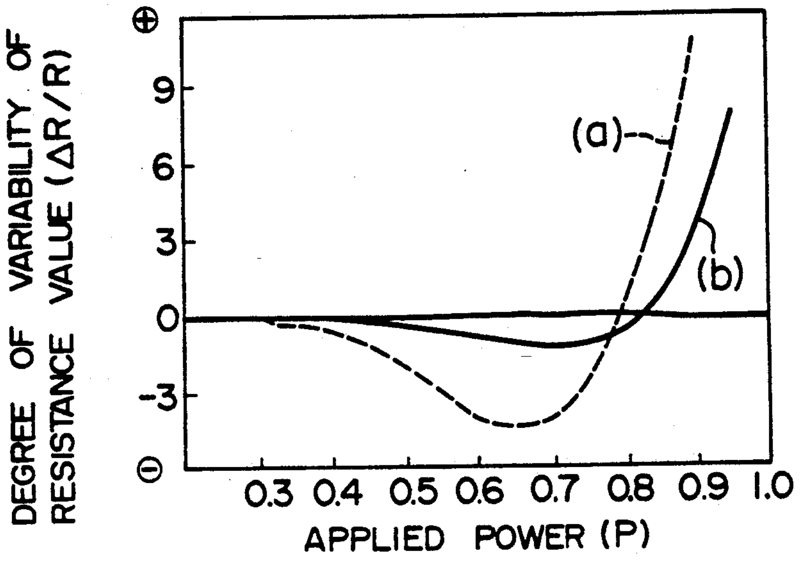
FIG. 11 is a graph showing the results of a step stress test.

FIG. 11 shows the reliability of thermal heads according to this invention depending on the SST characteristics compared with prior art thermal heads. In FIG. 11, the curve (a) shows the SST characteristics of a prior art thick film resistor material, and the curve (b) shows that of this invention. As shown in FIG. 11, the variation of resistance values among SST is very small, and the breakdown resistance power value is also raised. These properties are, needless to say, more excellent than the case of thin film thermal heads.

Figure 12:
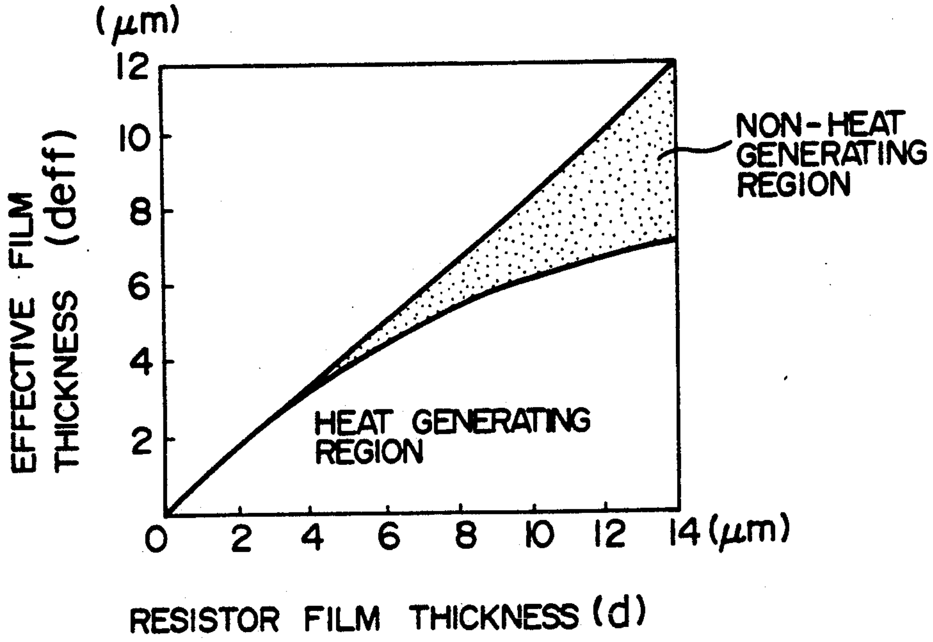
FIG. 12 is a graph showing a change of heat generating region depending on resistor film thickness change.

Further, according to this invention, thermal efficiency of thermal heads is improved indirectly. This is shown in FIG. 12 which shows a relationship between the resistor film thickness and the thermal efficiency. As is clear from FIG. 12, when the film thickness of the resistor increases, the proportion of the ineffective portion of resistor which does not pertain to heat generation increases. This is not preferable from the viewpoint of thermal efficiency. Recent tendency is to make the resistor film thickness thinner with a decrease of the thickness of the electrodes. In such a case, a prior art resistor containing gross ruthenium oxide fine particles having a particle diameter of more than 1 μm easily causes uneven distribution from a relation of the film thickness, which results in causing scattering of resistance values. In contrast, in the case of the thick film resistor obtained by removing ruthenium oxide particles having a particle diameter of more than 1 μm, the scattering of resistance values can be suppressed at a very low level and the thickness of the resistor can be reduced, which results in realizing high thermal efficiency.

What is claimed is:

1. A thermal head obtained by laminating a glaze layer, electrodes, a thick film resistor layer and a protective layer on an insulating substrate in this order, said resistor layer being obtained by calcining a mixed material consisting essentially of ruthenium oxide fine particles, glass fine particles having a particle size of at most 1 μm and a dispersant which disperses said fine particles and disappears by calcining, said ruthenium oxide particles having a specific surface area of 10 to 40 $m^2/g$ and a particle size of 1 μm as the upper limit value of particle size distribution, such that, after calcining, a uniform mutual distance between the fine particles of ruthenium oxide and uniform distribution of the fine particles of ruthenium oxide among the glass is achieved, as compared to the uniformity in mutual distance between particles and in particle distribution when the fine particles of ruthenium oxide are outside the specific surface area range of 10 to 40 $m^2/g$ and the upper limit value of particle size distribution of 1 μm, whereby scattering of resistance values of the thick film resistor is suppressed.

2. A thermal head according to claim 1, wherein the ruthenium oxide fine particles form a substantially uniform network in molten glass.

3. A thermal head according to claim 1, wherein said protective layer is obtained by, forming a glass coating on the resistor layer, followed by calcining.

4. A thermal head according to claim 1, wherein the substrate is an alumina plate.

5. A thermal head according to claim 1, wherein the glaze layer and the protective layer are made of glass.

6. A thermal head according to claim 1, wherein the electrodes are made of gold.

7. A thermal head obtained by laminating electrodes and a thick film resistor layer so as to overlie an insulating substrate, such that the electrodes are in between the substrate and the resistor layer, wherein the thick film resistor layer is formed by coating a material for the thick film resistor layer, the material for the thick film resistor layer consisting essentially of fine particles of ruthenium oxide; fine particles of glass which, during a calcining process of the material in forming a thick film resistor, become molten such that the material, after said calcining process, forms a network of ruthenium oxide in glass; and a dispersant which disperses these fine particles and disappears by calcining, said fine particles of glass having a particle size of at most 1 μm, said fine particles of ruthenium oxide having a specific surface area of 10 to 40 $m^2/g$ and a particle size of 1 μm as the upper limit value of particle size distribution, such that a uniform mutual distance between fine particles of ruthenium oxide and a uniform distribution of fine particles of ruthenium oxide among the glass particles is achieved, as compared to the uniformity in mutual distance between particles and in particle distribution when the fine particles of ruthenium oxide are outside the specific surface area range of 10 to 40 $m^2/g$ and the upper limit value of particle size distribution of 1 μm, whereby scattering of resistance values of the thick film resistor is suppressed.

8. A thermal head according to claim 7, wherein the thick film resistor layer is provided overlying the electrodes, and a protective layer overlies the thick film resistor layer.

9. A thermal head according to claim 8, wherein the protective layer is a glass layer.

10. A thermal head according to claim 9, wherein a glaze layer is provided between the substrate and the electrodes.

11. A thermal head according to claim 8, wherein the thick film resistor layer covers a central portion of the electrodes.

12. A thermal head according to claim 7, wherein said material for the thick film resistor layer further consists essentially of at least one oxide filler.

13. A thermal head according to claim 12, wherein said material for the thick film resistor layer further consists essentially of at least one other electroconductive substance, for improving breakdown power characteristics.

14. A thermal head according to claim 13, wherein the at least one oxide filler and the at least one other electroconductive substance in said material for the thick film resistor layer are particles, having a particle size of at most 1 μm.

15. A thermal head according to claim 7, wherein said material for the thick film resistor layer further consists essentially of at least one other electroconductive substance, for improving breakdown power characteristics.

16. A thermal head according to claim 7, wherein a glass material of the fine particles of glass is selected from the group consisting of borosilicate glass, silicate-lead glass and crystallized glass.

17. A thermal head according to claim 16, wherein the dispersant is selected from the group consisting of resins, and solvents, that can form a paste of fine particles of ruthenium oxide and fine particles of glass.

18. A thermal head comprising electrodes and a thick film resistor, the thick film resistor consisting essentially of ruthenium oxide dispersed in glass, the ruthenium oxide forming a network in the glass, said glass being obtained from fine particles of glass having a particle size of at most 1 μm, said ruthenium oxide being obtained from fine particles of ruthenium oxide having a specific surface area of 10 to 40 $m^2/g$ and a particle size of 1 μm as the upper limit value of particle size distribution, such that a uniform mutual distance between the fine particles of ruthenium oxide and a uniform distribution of the fine particles of ruthenium oxide among the glass is achieved, as compared to the uniformity in mutual distance between particles and in particle distribution when the fine particles of ruthenium oxide are outside the specific surface area range of 10 to 40 $m^2/g$ and the upper limit value of particle size distribution of 1 μm, whereby scattering of resistance values of the thick film resistor is suppressed.

19. A thermal head according to claim 18, wherein the electrodes and thick film resistor are provided on a substrate.

20. A thermal head according to claim 19, wherein the thick film resistor overlies the electrodes, and has a protective layer thereover.

21. A thermal head according to claim 20, further comprising a glaze layer provided between the substrate and the electrodes.

22. A thermal head according to claim 20, wherein the thick film resistor covers a central portion of the electrodes.

23. A thermal head according to claim 18, further consisting essentially of at least one oxide filler dispersed in the glass.

24. A thermal head according to claim 23, further consisting essentially of at least one other electroconductive substance dispersed in the glass.

25. A thermal head according to claim 18, wherein the fine particles of ruthenium oxide have a particle size less than 1 μm, as the upper limit value of particle size distribution.

* * * * *